Figure 4:
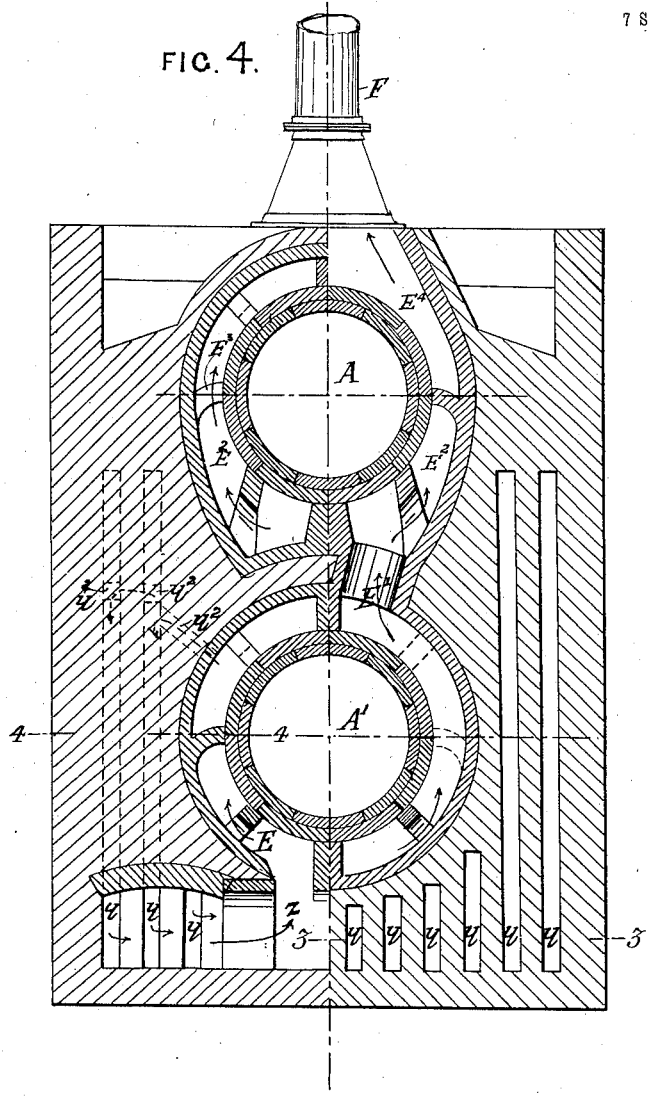

No. 833,394. PATENTED OCT. 16, 1906.
J. W. H. JAMES.
TREATING REFRACTORY METAL BEARING ORES, &c.
APPLICATION FILED JULY 31, 1903.
7 SHEETS—SHEET 1.
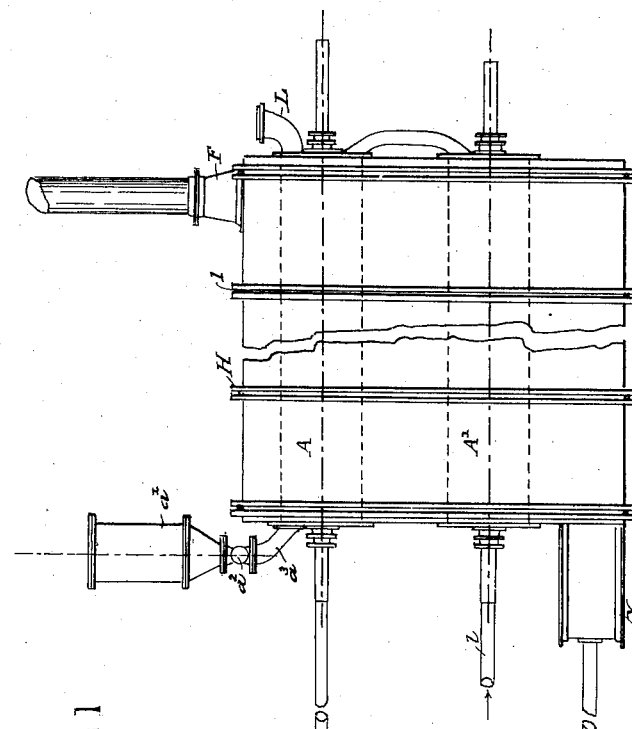
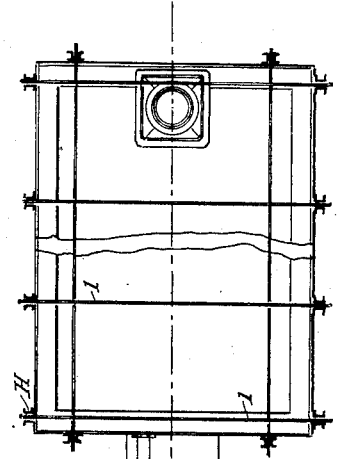
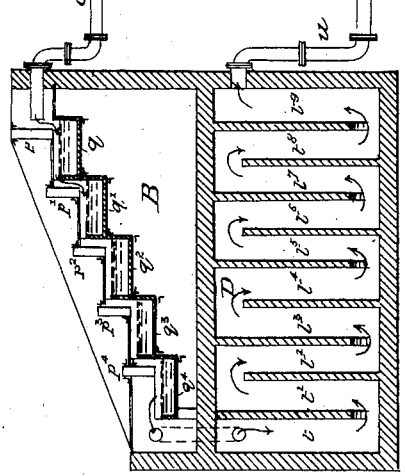
WITNESSES:
INVENTOR
JOHN W. H. JAMES,
BY
ATTORNEYS

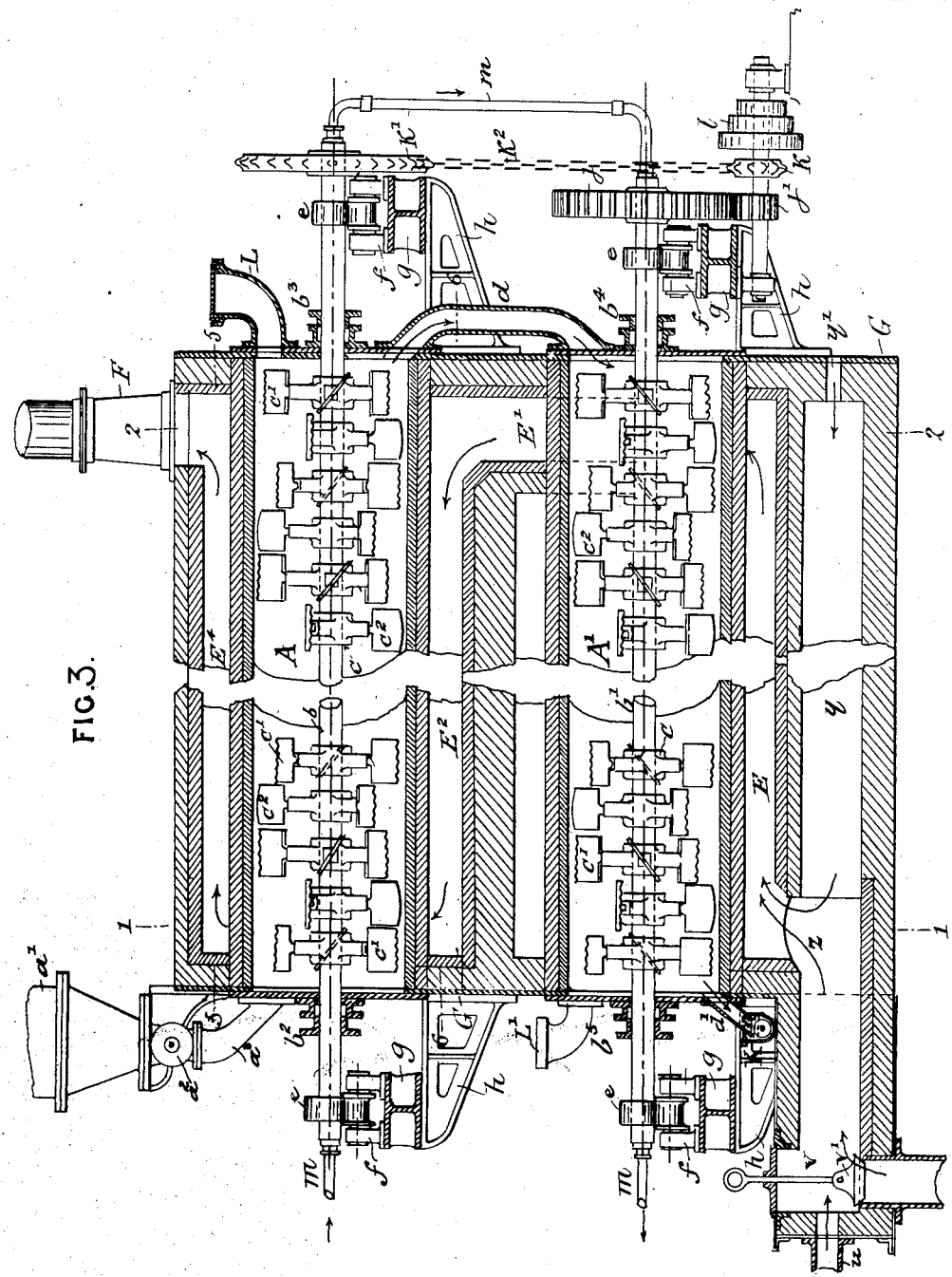

No. 833,394. PATENTED OCT. 16, 1906.
J. W. H. JAMES.
TREATING REFRACTORY METAL BEARING ORES, &c.
APPLICATION FILED JULY 31, 1903.

7 SHEETS—SHEET 3

WITNESSES:

INVENTOR
JOHN W.H. JAMES,
BY
ATTORNEYS

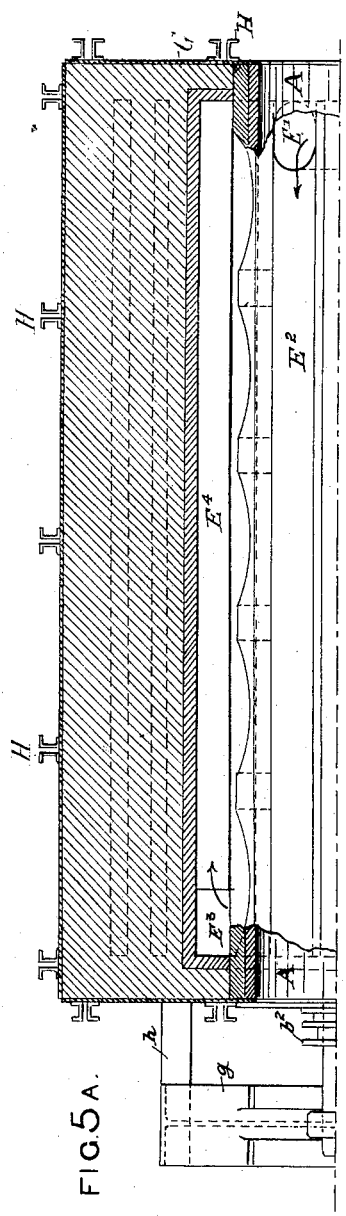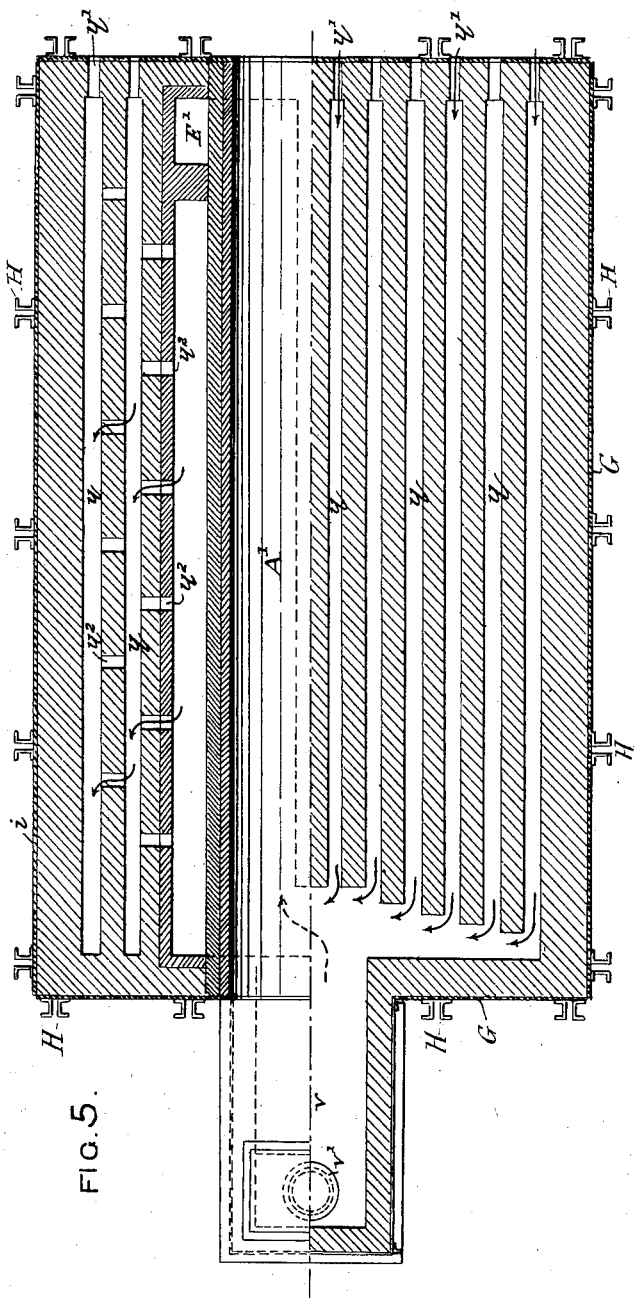

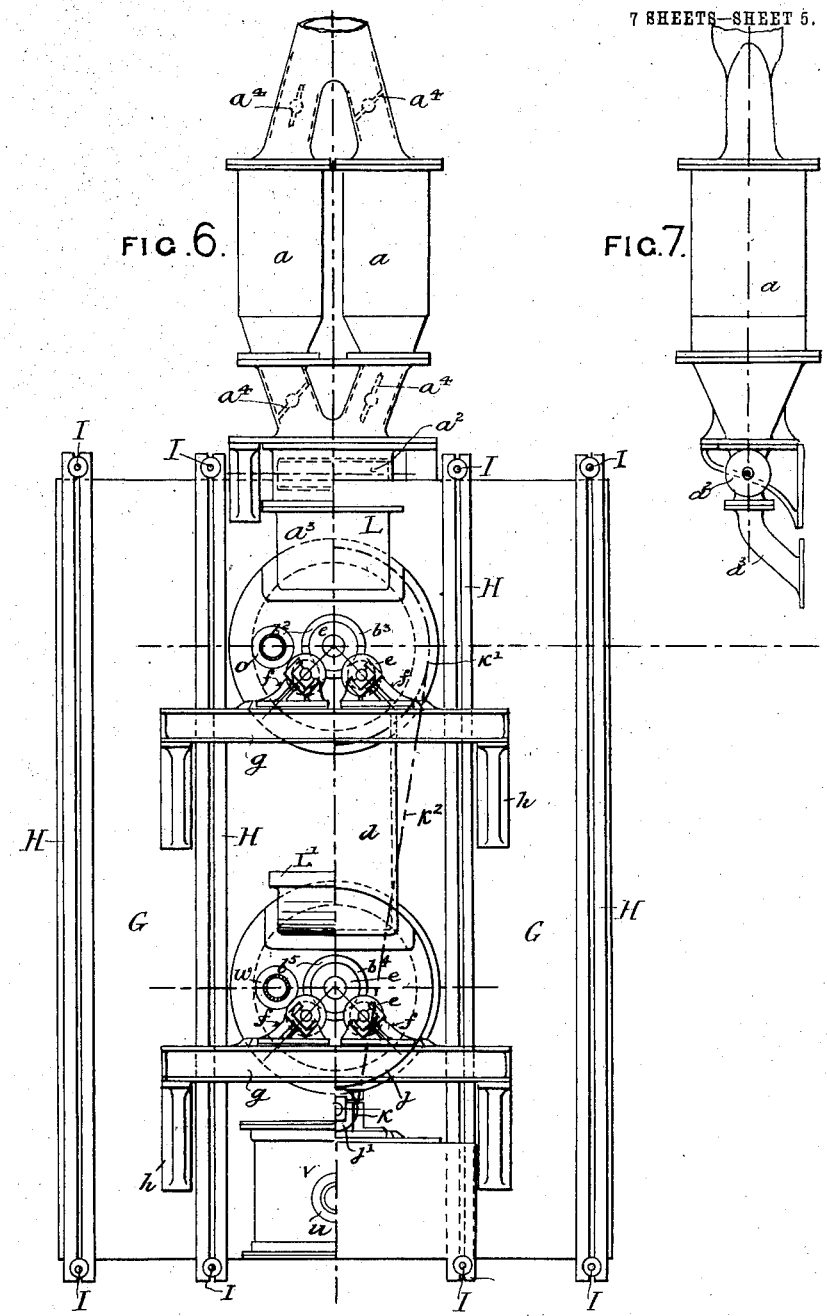

No. 833,394.  
PATENTED OCT. 16, 1906.

J. W. H. JAMES.  
TREATING REFRACTORY METAL BEARING ORES, &c.  
APPLICATION FILED JULY 31, 1903.

7 SHEETS—SHEET 6.

WITNESSES:

INVENTOR:  
JOHN W. H. JAMES,  
BY HIS ATTORNEYS;

No. 833,394. PATENTED OCT. 16, 1906.
J. W. H. JAMES.
TREATING REFRACTORY METAL BEARING ORES, &c.
APPLICATION FILED JULY 31, 1903.
7 SHEETS—SHEET 7.
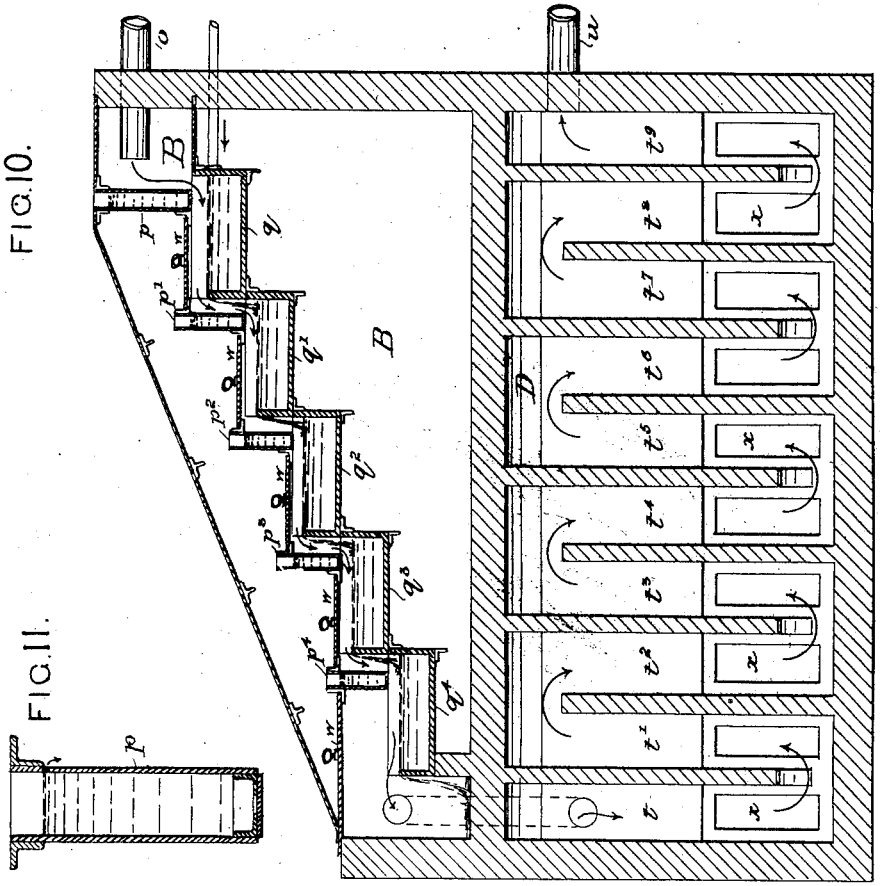
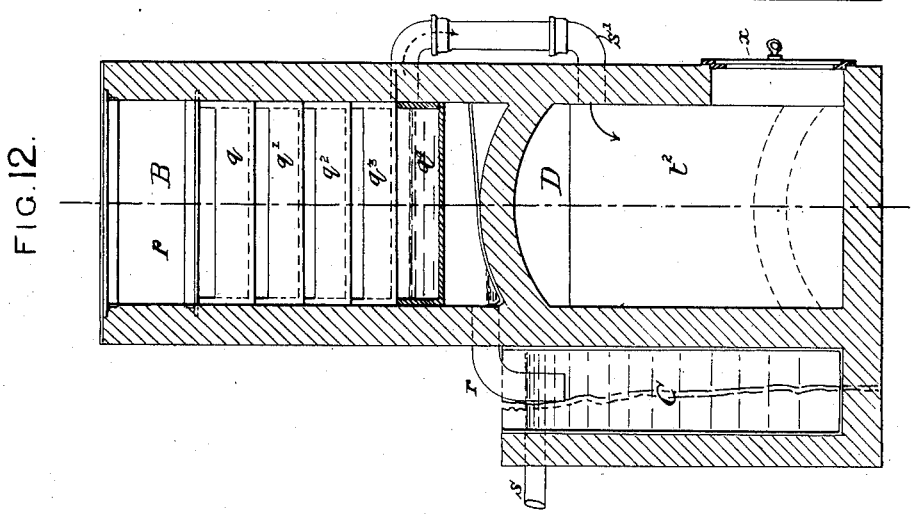
WITNESSES:
INVENTOR:
JOHN W. H. JAMES,
BY HIS ATTORNEYS;

UNITED STATES PATENT OFFICE.

JOHN WILLIAM HENRY JAMES, OF MEDIA, PENNSYLVANIA.

TREATING REFRACTORY METAL-BEARING ORES, &c.

No. 833,394.   Specification of Letters Patent.   Patented Oct. 16, 1906.

Application filed July 31, 1903. Serial No. 167,769.

*To all whom it may concern:*

Be it known that I, JOHN WILLIAM HENRY JAMES, a subject of the King of Great Britain and Ireland, and a resident of Media, Delaware county, Pennsylvania, have invented certain Improvements in Treating Refractory Metal-Bearing Ores, &c., of which the following is a specification.

My invention consists, essentially, in a novel treatment of refractory gold, silver, and other metal-bearing ores and compounds, (hereinafter referred to as "ores",) its objects being, first, to eliminate from such ores the contained relatively baser metals or materials with which the gold or other metal sought to be recovered may be mechanically or chemically combined and which would hinder the amalgamation or other appropriate subsequent obtainment of the metal sought, and, second, to facilitate such obtainment, lessen the loss of the metal sought, and recover the by-products.

To this end the improved treatment consists in subjecting the ore—say, by way of example, auriferous ore—while being roasted without access of air in a closed or sealed chamber or furnace, or in a series thereof, under varying temperatures to the action of water-gas, which is caused to circulate through the ore in the closed or sealed chamber of the furnace, and while or after so doing is operative in the following ways: first, in causing the ore to become exceedingly friable, much more so than the best roasted quartz from open kilns and so much so that it may easily be broken by hand and can be passed between crushing-rolls, so that stamps and grinding apparatus can be dispensed with, thereby effecting considerable economy; second, in causing the auriferous particles to assume a globular or approximately globular form, (the more minute the metallic particle the more perfect the spheroidal form,) in consequence of which the loss in the form of float-gold is reduced to a minimum; third, in causing sulfur, arsenic, tellurium, antimony, bismuth, zinc, lead, iron, and copper pyrites, iron oxids, and the other baser metals or materials with which the gold may be chemically or mechanically combined to be eliminated from the ore and either carried off by the water-gas as volatile compounds or reduced to such a condition that the gold can be readily obtained by amalgamation or otherwise; fourth, in permitting a ready separation of such absorbed volatile compounds by precipitating the same in suitably-constucted wet and dry chambers, and, fifth, in providing after being freed from such volatile compounds and returned to the furnace a valuable addition to the carbon monoxid employed for heating purposes, thereby effecting a saving in fuel.

The water-gas is preferably employed in the condition of about equal volumes of associated but uncombined hydrogen and carbon monoxid, as the action thereof is then more speedy and complete, due to the conjoint action of such constituents.

In carrying out the improved treatment I prefer to use an arrangement of apparatus which is so constructed that repairs, renewals, and proper performances of their functions by the various parts can be readily effected, large bodies of material can be treated, uniform action secured, and the greatest possible values saved.

The apparatus consists of an improved furnace provided, by preference, with two or more cylindrical retorts, each containing a chamber closed or sealed against ingress of air and heated from the exterior by means of ordinary producer-gas generated in any convenient form of gas-producer, which may, if desired, also be capable of generating water-gas, the producer-gas being utilized for the purpose of heating the closed chambers to their required temperatures, while the water-gas is employed within the closed or sealed chambers for the treatment of the ore, but is not ignited therein, having no heating function within the retort, and acting as a medium for absorbing or combining with the volatile ingredients of the ore, for which it has an affinity, and conveying the same to precipitating-chambers. The ore in the first place is conveyed alternately to a pair of hoppers arranged so that while ore is being fed to the furnace from one hopper the other is being filled, provision being made to exclude the air from each hopper when it is discharging ore into the treating-chamber. At the base of the hoppers is a mechanically-driven feeding device to insure uniform delivery of ore to the upper treating-chamber of the furnace, where it is turned over by a series of driven rakes or agitators in order that it may be thoroughly exposed to the action of the water-gas and is moved from end to end of said upper treating-chamber by a series of blades set at the required angle for moving the ore at the proper velocity, such rakes and blades being fastened to a hollow revolving shaft. After traveling through the upper treating-chamber the ore passes to the lower one, where it is turned over and conveyed in like manner to the outlet, which terminates in a water-sealed trough in order to effectively close the chamber against admission of air or escape of water-gas, said trough being fitted with any convenient form of conveyer which carries the treated ore (in a state of free or sweet ore) to the crushing-rolls, the slime being then run into amalgamators for saving the gold.

The great advantage of a furnace with two closed treating or roasting chambers is that in treating refractory gold-bearing ores by this method an initial temperature of only about 900° Fahrenheit can be used for volatilization of the lighter compounds in the upper chamber, the treatment being completed in the lower closed chamber at about 2,000° Fahrenheit.

The gaseous fuel (producer-gas) for heating and the superheated air for admixture therewith are introduced at opposite ends of the furnace, but are united in the gas-port, where they are ignited and the products of combustion after traversing the whole length of the lower retort pass up to the under side of the upper retort, along the crown of the same, and finally escape through a chimney.

The water-gas is admitted to the lower closed chamber and travels in a direction opposite to the travel of the ore to be treated, passing from the lower to the upper chamber through the connecting ore-chute, and after traversing the length of said upper chamber it is drawn into a precipitating-chamber, which is connected to the gas-port of the furnace, thus giving the needed draft. The water-gas is preferably maintained under a light pressure in the treating-chambers, so as to effectually prevent any inflow of air. The water-gas having absorbed the volatile compounds for which it has an affinity strikes a series of baffle or cooling plates, fitted in the closed precipitating-chamber, and is thereby deflected to the surface of slowly-running water contained in a group of tanks, in which the various matters susceptible of precipitation will be deposited according to their specific gravities, the surplus water being carried to a settling-tank, thus obviating loss by reason of any of the deposits being carried off by the water.

To insure the saving of compounds that may have been carried off by the gas on leaving the wet precipitating-chamber, said gas is passed through a lower chamber with a series of dry precipitating flues or compartments, which also have the effect of drying the water-gas prior to its return to the furnace, where it is mixed with the producer-gas and burned in the combustion-chamber, thereby saving fuel and increasing the temperature, because the water-gas burns at a higher temperature than producer-gas.

Though the improved treatment, as hereinbefore described, has particular reference to refractory auriferous ores, it is also, as aforesaid, applicable to ores or compounds containing only the commoner metals, such as phosphoric iron ores or copper pyrites, the treatment effecting such thorough roasting of the ore that there is no difficulty in smelting the same, and therefore a vast saving is effected in the linings, and therefore in the life, of blast and open-hearth furnaces.

In order that my invention and the manner of performing the same may be more fully understood, I have appended drawings showing the method of carrying my invention into effect.

Figure 8:
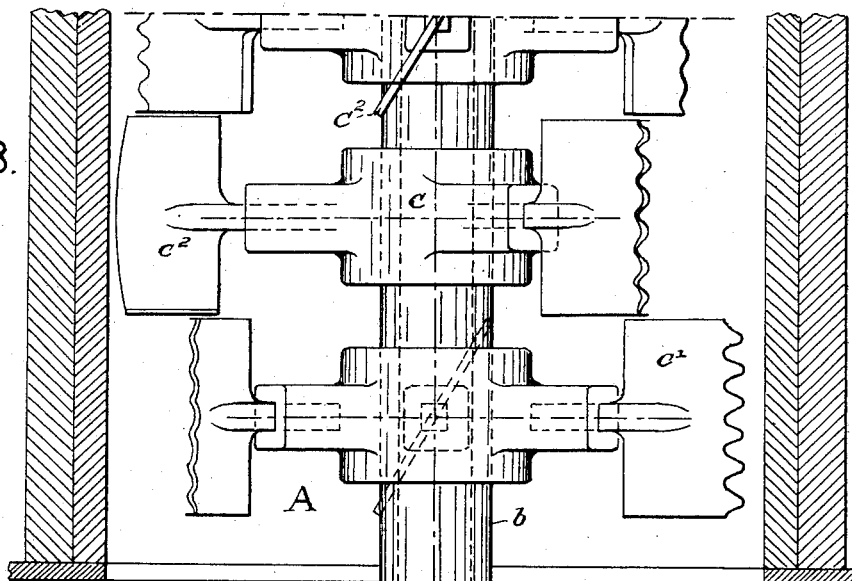
Figure 9:
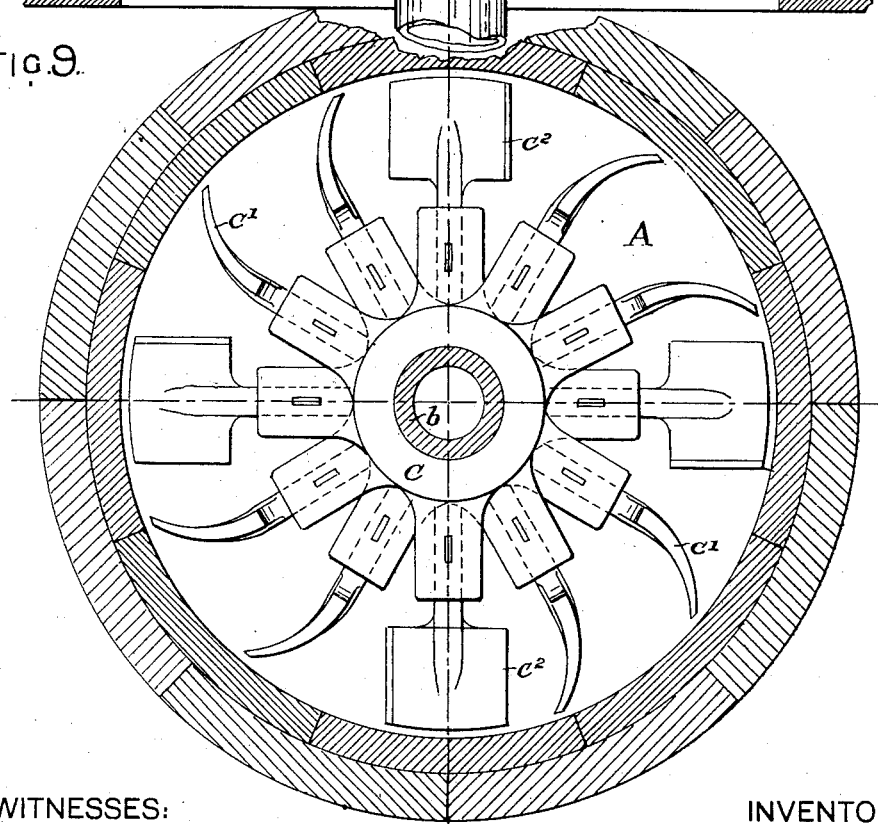

In the drawings, Figure 1 is a side elevation of the furnace and a vertical section of the precipitator. Fig. 2 is a plan view of the same. Fig. 3 is a longitudinal section of the furnace on a larger scale. Fig. 4 is a transverse section of the same, partly on the line 1 1 and partly on the line $a\,a$, Fig. 3. Fig. 5 is a sectional plan, partly on the line 3 3 and partly on the line 4 4, Fig. 4. Fig. $5^a$ is a sectional plan, partly on the line 5 5 and partly on the line 6 6, Fig. 3. Fig. 6 is a view partly in front elevation and partly in rear elevation. Fig. 7 is a side elevation of the furnace-feeding device. Fig. 8 is an enlarged sectional plan view of part of one of the heating chambers or retorts of the furnace with its stirrers and feeders. Fig. 9 is a transverse section of the same. Fig. 10 is an enlarged longitudinal section of the precipitator. Fig. 11 is a transverse section of the same, and Fig. 12 is a section of one of the elements of the precipitator.

The reference-letters denote corresponding parts in all of the views.

$a\,a$ are the closed hoppers for reception of ore.

$a^2$ is the mechanically-driven feeding-drum. $a^3$ is a chute leading therefrom, through which the ore passes to the upper closed or sealed treating or roasting chamber A.

$a^4$ represents flap-valves for closing the upper and lower ends of the hoppers against the admission of air when necessary.

$b\,b'$ are hollow shafts passing through both ends of the upper and lower roasting-chambers through stuffing-boxes $b^2\,b^3\,b^4\,b^5$, packed with asbestos for exclusion of air. Upon said shafts $b\,b'$ are fastened disks $c$, fitted with rakes or stirrers $c'$ for turning over and keeping the ore constantly agitated and exposed to the action of the water-gas, and blades $c^2$, set at the required angle for moving the ore from end to end of the roasting-chambers at the required velocity, each of said disks $c$ being fitted with two rakes $c'$ and one blade $c^2$. $d$ is a chute through which the ore after traveling through the upper chamber drops to the lower closed or sealed treating or roasting chamber A' and through which also the water-gas travels from the lower chamber A' to the upper chamber A. The ends of said hollow shafts $b$ $b'$ are provided with disks $e$, which are carried upon roller-bearings $e'$, whose spindles run in bearings $f$, fastened to girders $g$, carried on brackets $h$, attached to the furnace-casing G, motion being given to the shaft $b'$ by cog-wheels $j$ $j'$ and to shaft $b$ by sprocket-wheels $k$ $k'$ and link chain $k^2$, variable speeds being provided by cone-pulley $l$.

$w$ is the pipe through which the water-gas is introduced into the lower treating-chamber A'.

Shafts $b$ $b'$ are made hollow, as shown in Fig. 9, for the purpose of circulating water through them in order to prevent warping, due to the heat, the water being conveyed to the shaft $b$, from said shaft $b$ to the shaft $b'$, and from the latter by pipes $m$.

$d'$ is a chute through which the treated and roasted ore is discharged into a conveyer K of suitable construction, fitted in a water-trough to prevent the admission of air into and the escape of gas from the lower treating-chamber, said conveyer delivering the ores either to the amalgamators or smelters, according as they are auriferous or baser ores.

B, Figs. 1 and 10, is the closed precipitating-chamber, and $o$ is a pipe leading thereto from the upper closed or sealed treating or roasting chamber A, through which pipe passes the gas charged with the volatile compounds which it has absorbed. On entering the chamber B the gas strikes the baffle or cooling plates $p$ $p'$ $p^2$ $p^3$ $p^4$, made in the form of narrow tanks, Fig. 11, containing slowly-running water, these baffle-plates deflecting the traveling water-gas onto the surface of slowly-running water contained in precipitating-tanks $q$ $q'$ $q^2$ $q^3$ $q^4$, the surplus water passing through a pipe $r$, Fig. 12, to a settling-tank C with overflow-pipe $s$, while the water-gas passes from the upper wet precipitating-chamber through a pipe $s'$ to the lower dry chamber D, which is divided up into flues or compartments $t$ $t'$ $t^2$, &c., and is thence drawn into the combustion-chamber of the furnace through a pipe $u$, which connects with the gas-box V, the water-gas being therein combined with the producer-gas after having been freed by the precipitating-chamber from all of the volatile compounds absorbed by it in the treating and roasting chambers. The upper and lower precipitating-chambers are fitted with doors W and X, Figs. 10 and 12, for emptying said tanks and chambers of the by-products saved by this method.

The gaseous fuel or producer-gas is conveyed direct from the gas-generator to the gas-box V through a passage $v^2$, provided with a regulating-valve $v'$.

$y$ represents channels or ducts to which air is admitted through apertures $y'$, said air passing through said channels, beneath and around the combustion-chamber, and becoming thereby heated before admixture with the producer-gas in the gas-passage, thus insuring perfect combustion.

The products of combustion travel in flues E from end to end of the lower retort, being confined to the lower portion of the retort by the partitions $y^3$, thus heating the ore in the lower sealed treating or roasting chamber A'. From the flues E the gases pass upward through the end flues E', thence along the under side of the upper retort through the flues $E^2$, thence up through the flues $E^3$ to the crown of the upper retort, and thence backwardly through the flue $E^4$, escaping finally through the chimney.

The air-passages $y$ are in communication, through passages $y^2$, with the chamber above the lower retort, so as to provide additional heating-surfaces for the air.

When the heat of the water-gas is sufficient for the intended purpose, the external heating of the retorts may be dispensed with.

The ends and sides of the furnace are cased with iron plates G, suitably tied by buckstaves H and tie-bolts I. Sealed vents L and L' are provided for the chambers A A', respectively, in order to act as safety-valves.

Instead of generating the water-gas in a separate generator and introducing the same into the closed or sealed treating-chambers said gas may, if desired, be generated directly in said chambers by mixing crushed charcoal or coke with the ore and injecting low-pressure steam into said chambers, and in some cases this may be considered the preferable plan.

The present cost of treating complex refractory or telluride gold-bearing ores is so high that it precludes the treatment of low-grade ores, owing to the difficulty in smelting, and such ores, containing arsenic, sulfur, phosphorus, lead, zinc, copper pyrites, and iron oxids, do not lend themselves readily to chemical treatment, and in any case it is difficult to recover a fair value of the precious metal. I have found, however, that most of the above ingredients or compounds are volatilized in the sealed furnace, absorbed by the water-gas, and carried off to the precipitating-chamber, the cost of the treatment being but a small fraction of the usual cost, and besides this nearly all of the by-products are recovered during the operation, which still further increases the operating expenses. I have found, moreover, that in treating very refractory gold-bearing ore ninety-eight per cent. of the assay value of the gold was recovered.

While it is possible to carry out the essential features of my improved process in a single chamber, the double roasting-chamber is preferred, because thereby varying temperatures are attainable, as it has been found of great advantage to commence the treatment in the upper chamber at about 900° Fahrenheit, finishing in the lower chamber at about 2,000° to 2,300° Fahrenheit, which enables the lighter volatile compounds to be carried off first. These temperatures might vary with some classes of ore; but it is advantageous to finish at a high temperature, especially when the gold is in a fine flaky condition, for in that case the minute particles assume a globular form and are less liable to be carried off as float-gold in the process of amalgamation.

Having thus described my invention, I claim and desire to secure by Letters Patent—

1. The mode herein described of treating refractory metal-bearing ores, said mode consisting in passing the ore in a loose state through an externally-heated retort, from which the air is excluded, and generating water-gas in said retort, substantially as specified.

2. The mode herein described of treating refractory metal-bearing ores, said mode consisting in passing the ore in a loose state through an externally-heated retort, from which the air is excluded, generating water-gas in said retort, and separating from the escaping water-gas other gases and volatile compounds carried off thereby from the ore, substantially as specified.

In testimony whereof I have signed my name to this specification in the presence of two subscribing witnesses.

JOHN WILLIAM HENRY JAMES.

Witnesses:
 F. E. BECHTOLD,
 JOS. H. KLEIN.